(12) United States Patent
Ringler et al.

(10) Patent No.: US 11,938,906 B2
(45) Date of Patent: Mar. 26, 2024

(54) CLEANING APPARATUS HAVING A PISTON

(71) Applicant: Continental Automotive GmbH, Hannover (DE)

(72) Inventors: Dirk Ringler, Friedewald-Motzfeld (DE); Stefan Schäckel, Bad Hersfeld (DE); Reiner Krauße, Herleshausen-Willershausen (DE); Ilja Prygunkov, Mainz (DE)

(73) Assignee: Continental Automotive GmbH, Hannover (DE)

( * ) Notice: Subject to any disclaimer, the term of this patent is extended or adjusted under 35 U.S.C. 154(b) by 236 days.

(21) Appl. No.: 17/298,466

(22) PCT Filed: Nov. 29, 2019

(86) PCT No.: PCT/EP2019/083158
§ 371 (c)(1),
(2) Date: May 28, 2021

(87) PCT Pub. No.: WO2020/109593
PCT Pub. Date: Jun. 4, 2020

(65) Prior Publication Data
US 2022/0024420 A1 Jan. 27, 2022

(30) Foreign Application Priority Data

Nov. 29, 2018 (DE) ...................... 10 2018 220 582.5

(51) Int. Cl.
*B60S 1/52* (2006.01)
*B05B 9/047* (2006.01)
*B08B 3/02* (2006.01)

(52) U.S. Cl.
CPC ............... *B60S 1/52* (2013.01); *B05B 9/047* (2013.01); *B08B 3/02* (2013.01); *B08B 2203/027* (2013.01)

(58) Field of Classification Search
None
See application file for complete search history.

(56) References Cited

U.S. PATENT DOCUMENTS

| | | | |
|---|---|---|---|
| 6,905,078 B1 | 6/2005 | Gattuso et al. | |
| 11,305,737 B2 * | 4/2022 | Baudouin | B08B 3/02 |

(Continued)

FOREIGN PATENT DOCUMENTS

| | | |
|---|---|---|
| CN | 105922978 A | 9/2016 |
| CN | 107640132 A | 1/2018 |

(Continued)

OTHER PUBLICATIONS

Search Report dated Nov. 20, 2019 from corresponding German Patent Application No. DE 10 2018 220 582.5.

(Continued)

*Primary Examiner* — Spencer E. Bell
*Assistant Examiner* — Omair Chaudhri

(57) ABSTRACT

A cleaning apparatus, optimized for cleaning optical and optoelectronic sensor devices in motor vehicles, comprising a housing, and a reciprocating piston movable in a pressure-controlled manner in the housing and movable from a retracted position into a deployed position along an actuation axis is disclosed. The reciprocating piston has an inner channel to transport a cleaning fluid through the reciprocating piston to a spray nozzle. A miniaturized, easily and inexpensively producible cleaning apparatus which makes possible exact and precise orientation of the cleaning jet, quick operational readiness, reduced tendency for follow-up flow of the cleaning fluid, and improved adaptability to different installation positions, is also disclosed. In an embodiment at least the cleaning apparatus has at least one guide to prevent rotation of the reciprocating piston about the actuation axis during its entire stroke, the at least one (Continued)

Figure 2:
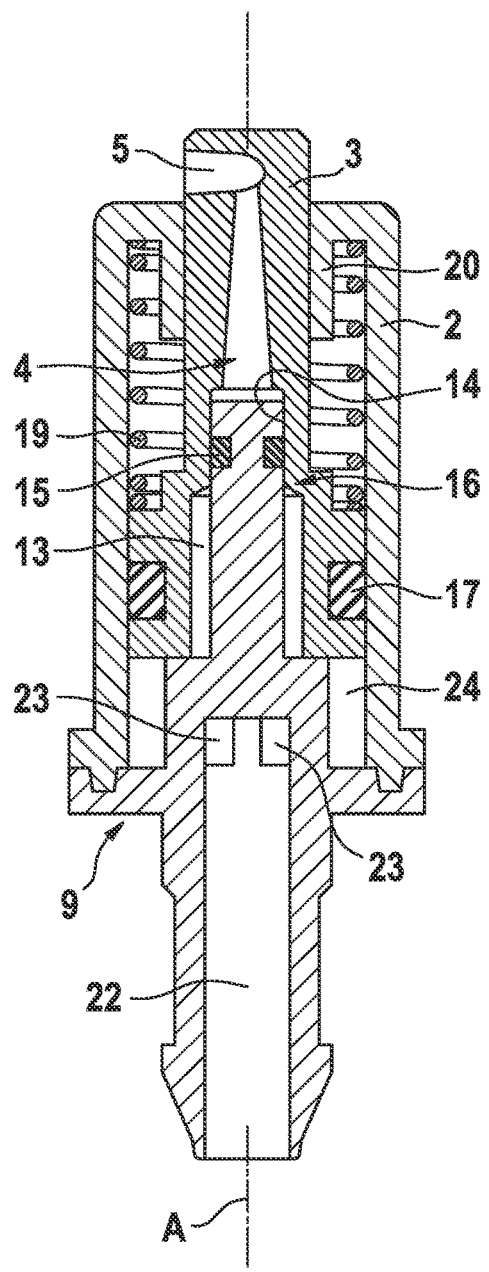

guide means arranged at least regionally in the inner channel.

15 Claims, 7 Drawing Sheets

(56) References Cited

U.S. PATENT DOCUMENTS

| | | | |
|---|---|---|---|
| 2003/0116645 A1* | 6/2003 | Hirose | B60S 1/528 239/284.2 |
| 2006/0113404 A1* | 6/2006 | Sato | B60S 1/528 239/284.1 |
| 2009/0014555 A1* | 1/2009 | Litvinov | B05B 1/3447 239/284.2 |
| 2009/0283605 A1* | 11/2009 | Arkashevski | B60S 1/50 15/250.05 |
| 2011/0113580 A1* | 5/2011 | Caillot | B60S 1/3862 15/250.32 |
| 2012/0090123 A1* | 4/2012 | Caillot | B60S 1/3881 15/250.04 |
| 2015/0078940 A1* | 3/2015 | Kikuta | F04B 17/03 417/443 |
| 2015/0138357 A1* | 5/2015 | Romack | B60S 1/52 348/148 |
| 2016/0167624 A1* | 6/2016 | Lansinger | F24H 1/121 219/202 |
| 2016/0251007 A1 | 9/2016 | Ko et al. | |
| 2016/0339875 A1* | 11/2016 | Ina | B60S 1/522 |
| 2017/0259789 A1* | 9/2017 | McAndrew | B07B 1/145 |
| 2018/0021792 A1 | 1/2018 | Lopez et al. | |
| 2018/0304280 A1 | 10/2018 | Lopez et al. | |
| 2019/0232921 A1* | 8/2019 | Trebouet | B60S 1/56 |
| 2020/0290572 A1* | 9/2020 | Rachow | B60S 1/481 |
| 2021/0276514 A1* | 9/2021 | Baudouin | B60S 1/56 |

FOREIGN PATENT DOCUMENTS

| | | | | |
|---|---|---|---|---|
| DE | 4401744 A1 | * | 7/1994 | ............ B60S 1/528 |
| DE | 69200803 T2 | | 4/1995 | |
| DE | 69302129 T2 | | 8/1996 | |
| DE | 4121316 C2 | * | 3/1997 | ............ B60S 1/528 |
| DE | 19904989 A1 | | 8/2000 | |
| DE | 10125898 A1 | * | 12/2001 | ............ B60S 1/528 |
| DE | 10125898 A1 | | 12/2001 | |
| DE | 69630134 T2 | | 7/2004 | |
| DE | 60012156 T2 | | 8/2005 | |
| DE | 102004054230 A1 | * | 5/2006 | ............ B60S 1/528 |
| DE | 102004054230 A1 | | 5/2006 | |
| DE | 102008012485 A1 | * | 9/2009 | ............ B60S 1/528 |
| DE | 102008020879 A1 | | 10/2009 | |
| EP | 0262402 A2 | | 4/1988 | |
| EP | 0572147 B1 | * | 12/1993 | |
| EP | 2607213 A1 | * | 6/2013 | ............ B60S 1/528 |
| FR | 2796866 A1 | | 2/2001 | |
| FR | 2796866 A1 | * | 2/2001 | ............ B60S 1/528 |
| FR | 3021014 A1 | * | 11/2015 | ............ B60S 1/528 |
| FR | 3056520 A1 | | 3/2018 | |
| GB | 2157551 A | * | 10/1985 | ............... B60S 1/34 |
| JP | 2001347930 A | | 12/2001 | |
| WO | 2018/059807 A1 | | 4/2018 | |
| WO | 2018059802 A1 | | 4/2018 | |

OTHER PUBLICATIONS

International Search Report and Written Opinion dated Feb. 20, 2020 from corresponding International Patent Application No. PCT/EP2019/083158.

Office Action dated Nov. 29, 2023 from corresponding Chinese patent application No. 201980069402.8.

* cited by examiner

Fig. 1 a) b)
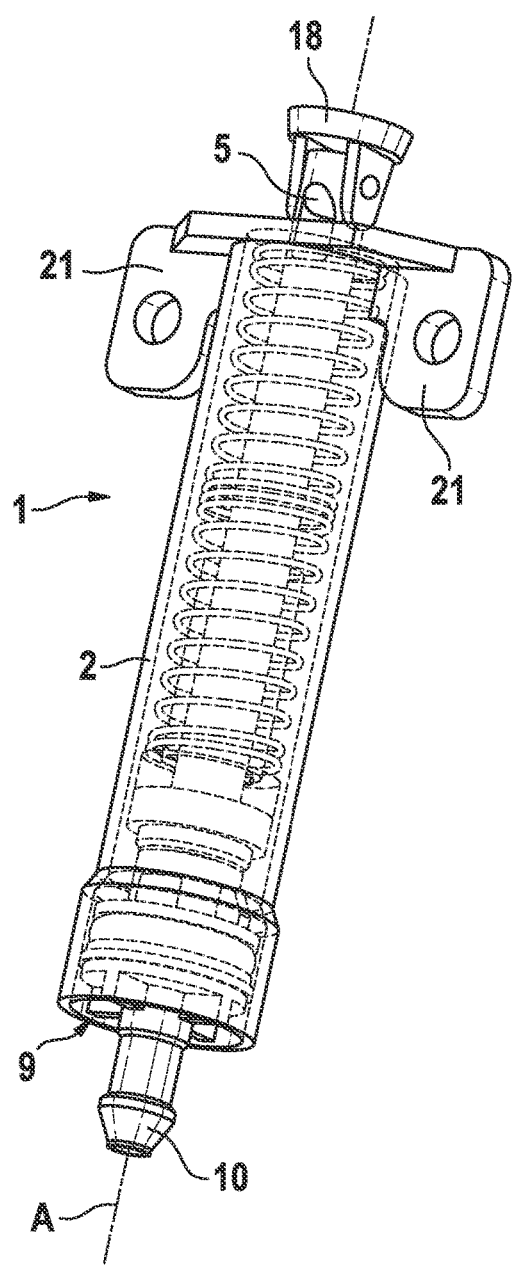
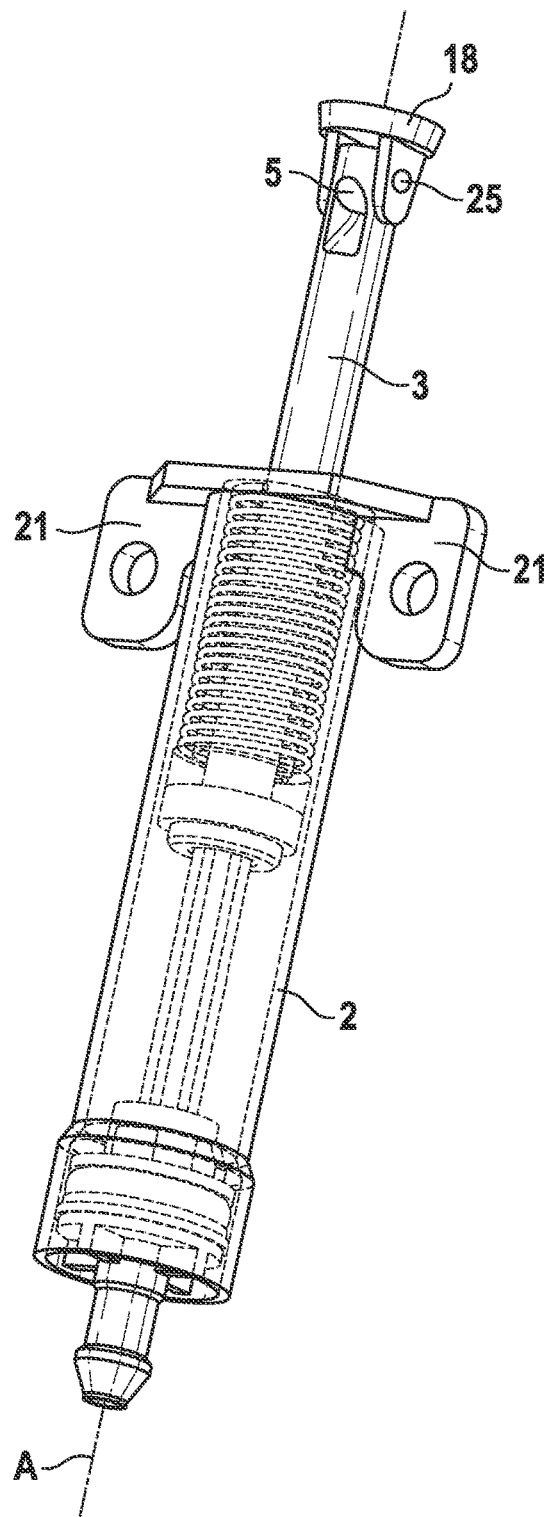

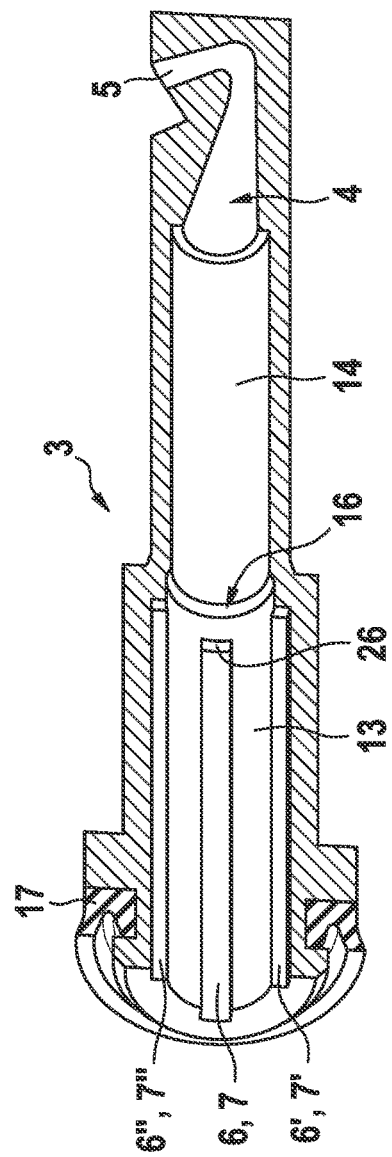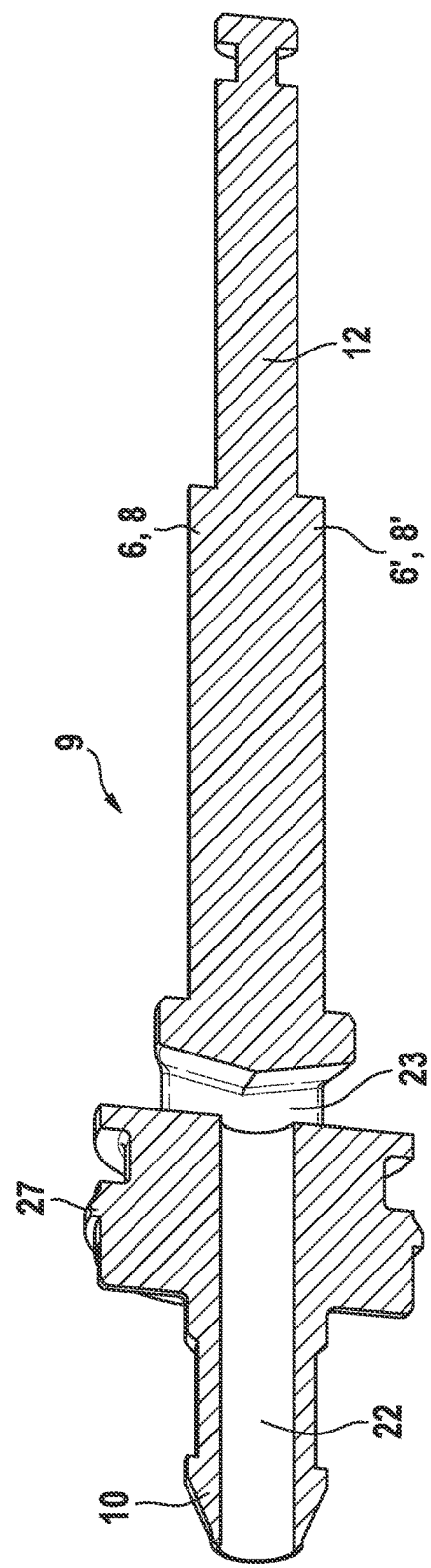

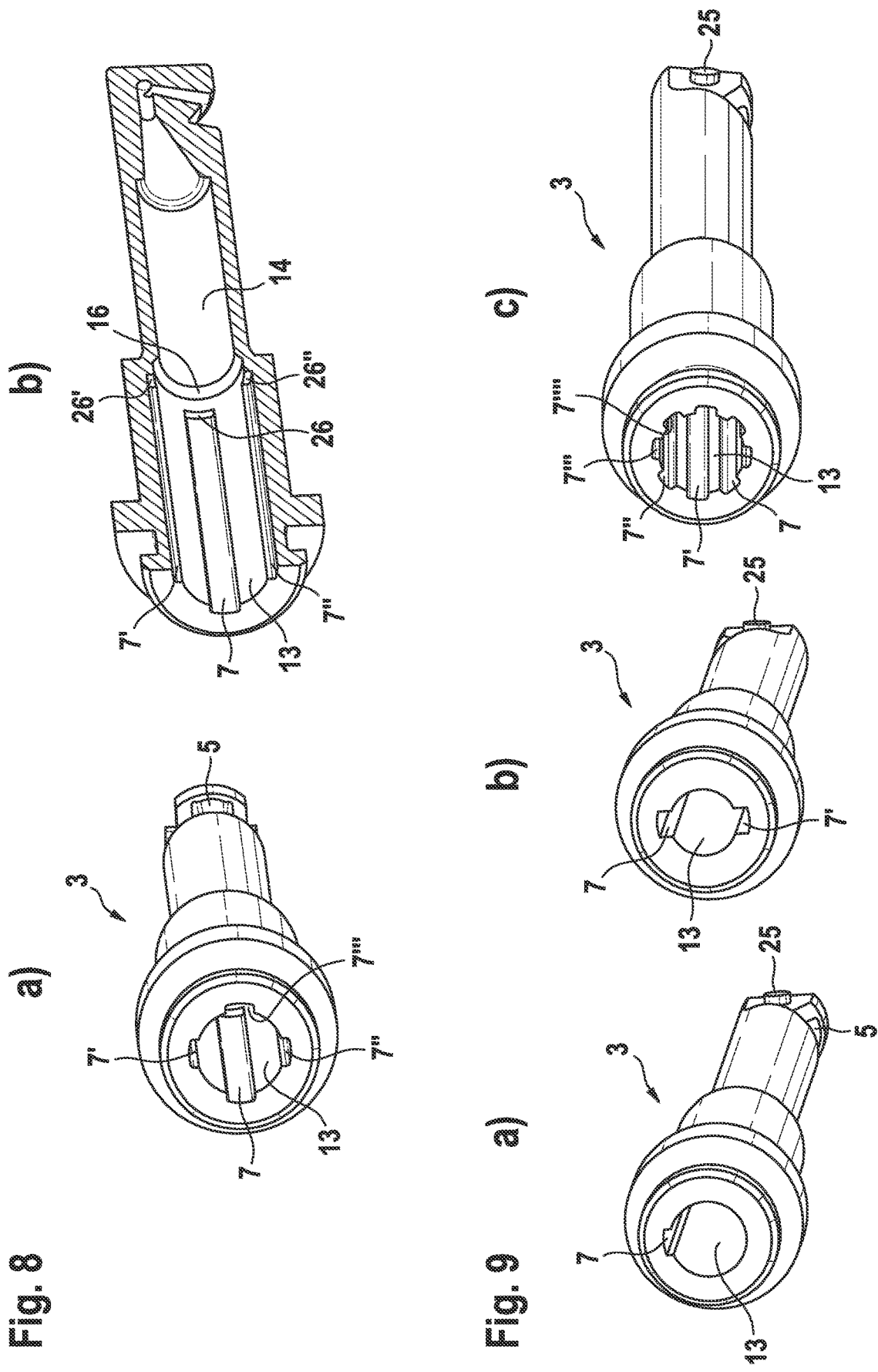

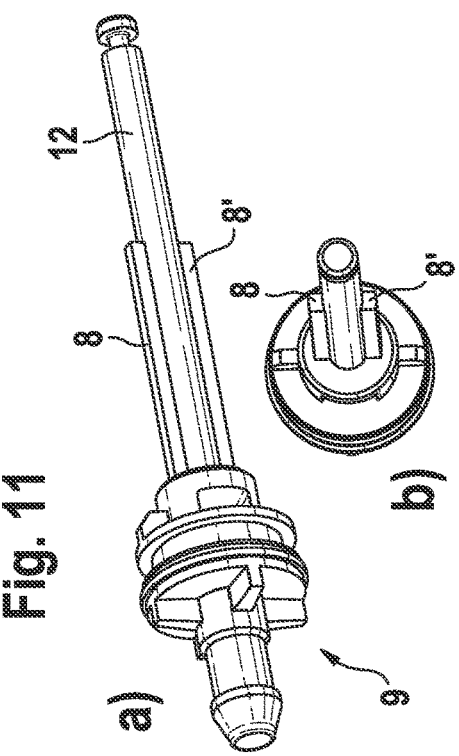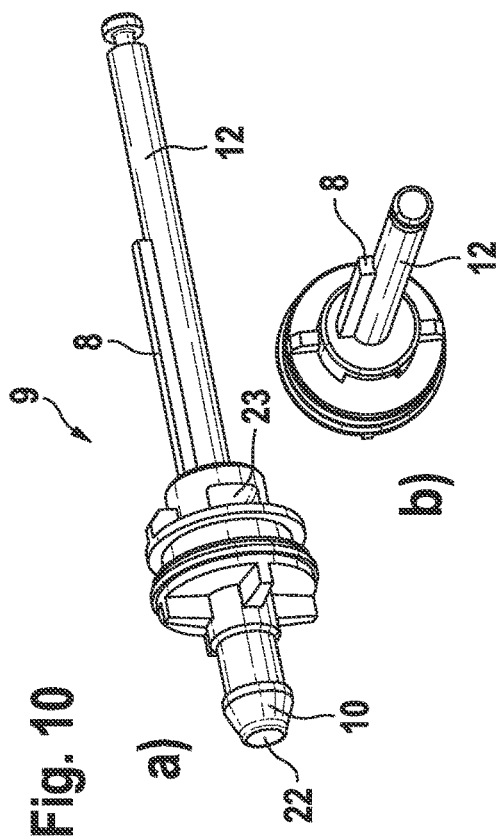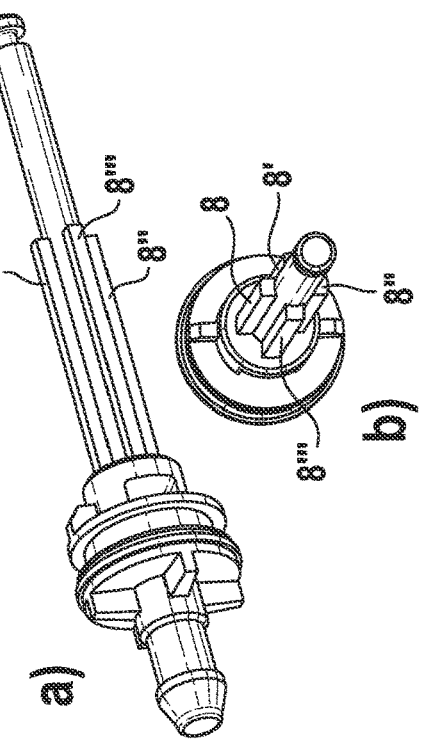

CLEANING APPARATUS HAVING A PISTON

Fluid cleaning apparatuses for installation into motor vehicles are widely used. If, for aerodynamic and aesthetic reasons, an appearance which is as inconspicuous as possible is desired here, it is known to use cleaning apparatuses with a spring-loaded, pressure-controlled reciprocating piston. The reciprocating piston is moved out of a non-actuated, normally retracted and thus concealed initial position by way of a hydraulic pressure of the cleaning fluid that is generated by a conveying device. In the process, said reciprocating piston, for the duration of the cleaning process only, moves a spray nozzle connected to it into an exposed, deployed spraying position. After deactivation of the conveying device, the reciprocating piston is pushed back into the initial position automatically by spring force.

A cleaning apparatus of said type is known for example from FR 2796866 A1. The cleaning liquid is added to the cleaning apparatus from a spatially distant conveying device via a supply line and a decentralized connector, and therein is transported further in the direction of a spray nozzle, which can be connected to the reciprocating piston, through an inner channel passing through the reciprocating piston.

Modern motor vehicles are increasingly being equipped with optical and optoelectronic sensor devices for detecting the vehicle surroundings, such as for example optical cameras, laser-based distance-measuring equipment and the like. For functional reasons, sensor devices of said type often have to be positioned at poorly accessible places with reduced installation space in the vehicle. Here, said sensor devices have transparent covers or lenses, which are attached in the outer region of the vehicle and have to be cleaned. Reliability of cleaning and economical use of the cleaning agent are thus tremendously important.

This gives rise to further particular requirements for a cleaning apparatus beside the aerodynamic and aesthetic reasons, such as for example miniaturization, the most exact and precise possible orientation of the cleaning jet, quick operational readiness, reduced tendency for follow-up flow of the cleaning fluid, and improved adaptability to different installation positions. Here, the intention is for the cleaning apparatus to have the simplest possible construction and to be inexpensively producible.

Known cleaning apparatuses having reciprocating pistons are unable, or are not sufficiently able, to meet such requirements.

Against this background, the invention is based on the object of offering an improved cleaning apparatus which is suitable for cleaning of optical or optoelectronic sensor devices and which meets the aforementioned specific requirements as optimally as possible.

Said object is achieved by the cleaning apparatus having the combination of features as claimed in claim 1. Refinements and various exemplary embodiments of the invention will emerge from the dependent claims and the following description and figures.

The invention provides that the cleaning apparatus has at least one guide means for preventing rotation of the reciprocating piston about the actuation axis during its entire stroke, which at least one guide means is arranged at least regionally in the inner channel.

This makes it possible to realize an exact and permanently precise orientation of the spray jet without separate add-on parts and to reduce servicing requirements.

According to a preferred refinement, guide means may be functionally reliably and favorable in terms of production as at least one groove and at least one projection which is guided therein. The projection can be produced with a rib-like shape in a particularly simple, dimensionally stable, robust and reliable manner.

The invention furthermore provides that the cleaning apparatus has an in particular integrally formed connection piece which is sealed off hydraulically with respect to the housing and on which a connector for connection of a feed line and a mandrel which projects into the inner channel are formed, wherein the reciprocating piston interacts with the connection piece for prevention of rotation, and wherein the connector is particularly preferably positioned coaxially with respect to the mandrel.

With such a highly integrated design, it is moreover possible for the dimensions to be kept particularly small and for the number of components to be reduced.

For the purpose of effective performance of a robust and permanently accurate blocking valve function, it is provided that the inner channel is formed at least regionally as a type of stepped bore, with a prechamber which is arranged at the inlet side and with a bore which opens out into the prechamber and has a smaller diameter, and wherein a sealing element for sealing off the mandrel with respect to the bore is provided such that the inner channel cannot be passed through hydraulically when the mandrel projects into the bore, and can be passed through hydraulically when the mandrel has been guided out of the bore.

The guide element according to the invention may be realized in a particularly simple and installation space-saving manner in that at least one groove is provided in the inner wall of the prechamber, and at least one projection which interacts with the groove is provided on the connection piece.

For a particularly exact valve function and associated particularly quick switchability and reaction speed of the cleaning apparatus, the groove or grooves, according to the invention, ends/end with a defined axial spacing to the opening-out point of the bore into the prechamber.

In order to be able to selectively realize different but exactly defined spraying directions with the same components, a preferred refinement of the invention provides that multiple grooves, which are in particular spaced apart from one another in a regular manner in the circumferential direction and run parallel to one another, are arranged in the inner wall of the prechamber.

For the purpose of advantageous reduction of the outer dimensions and improved installability, the invention provides that the connection piece is dimensioned and connected to the housing in such a way that, in the radial direction, it is situated completely within a contour which is defined by an outer contour of the housing in the region of the connection.

According to the preferred embodiment, the connection piece, particularly favorably in terms of assembly, may, in the radial direction, be received completely within the housing, in particular may be plugged into the housing.

Here, a refinement which is particularly preferred with regard to effective and secure assembly provides that the connection between the connection piece and the housing comprises at least one latching element which produces a form fit in the axial direction.

A preferred embodiment of the invention furthermore provides that the spray nozzle is formed so as to be integrated integrally in the reciprocating piston, which results in the number of components and assembly steps being further reduced and assembly errors being avoided.

Within the invention, on the reciprocating piston at the outlet side, there may be arranged a cover element for achieving an aesthetic and/or aerodynamic effect.

For effective guidance and support of the reciprocating piston, the invention provides that an axially inwardly directed collar is formed on the housing and surrounds the reciprocating piston radially at the outside and, in the deployed state, serves as a stop for defining the stroke length. By variation of the collar length, it is moreover possible for the stroke length to be adapted particularly easily in terms of construction.

Figure 3:
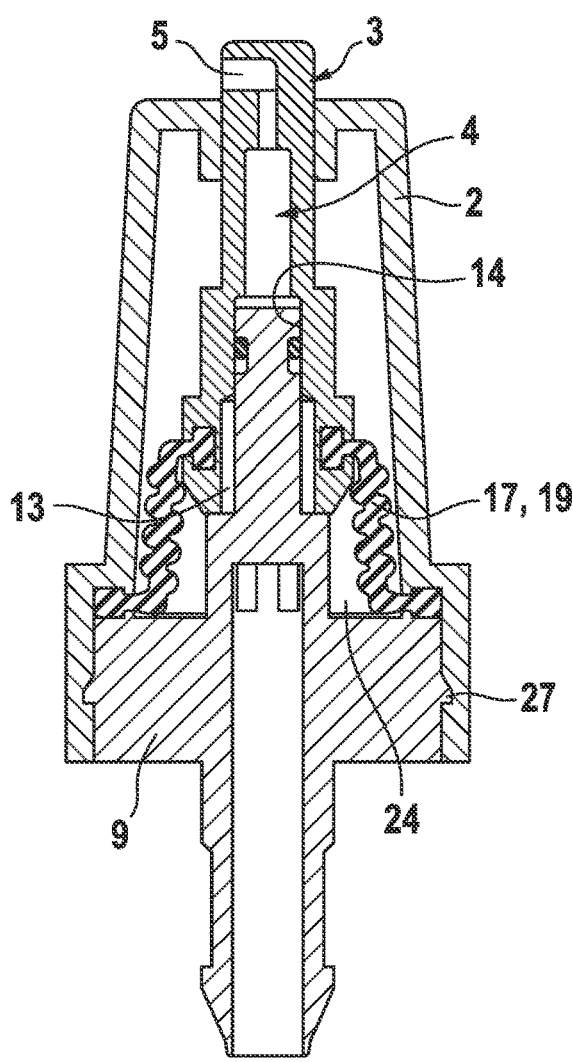
Figure 4:
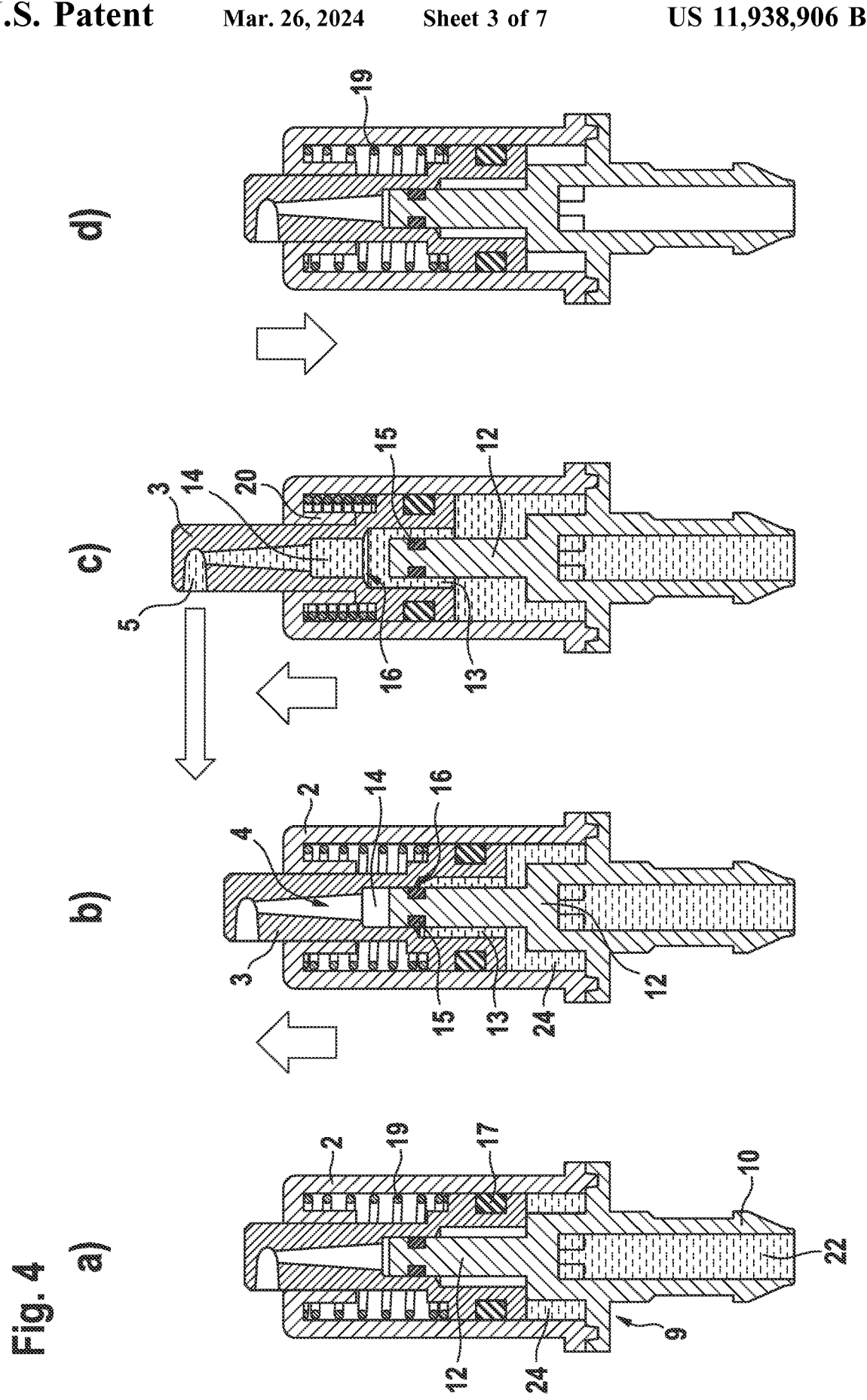
Figure 5:
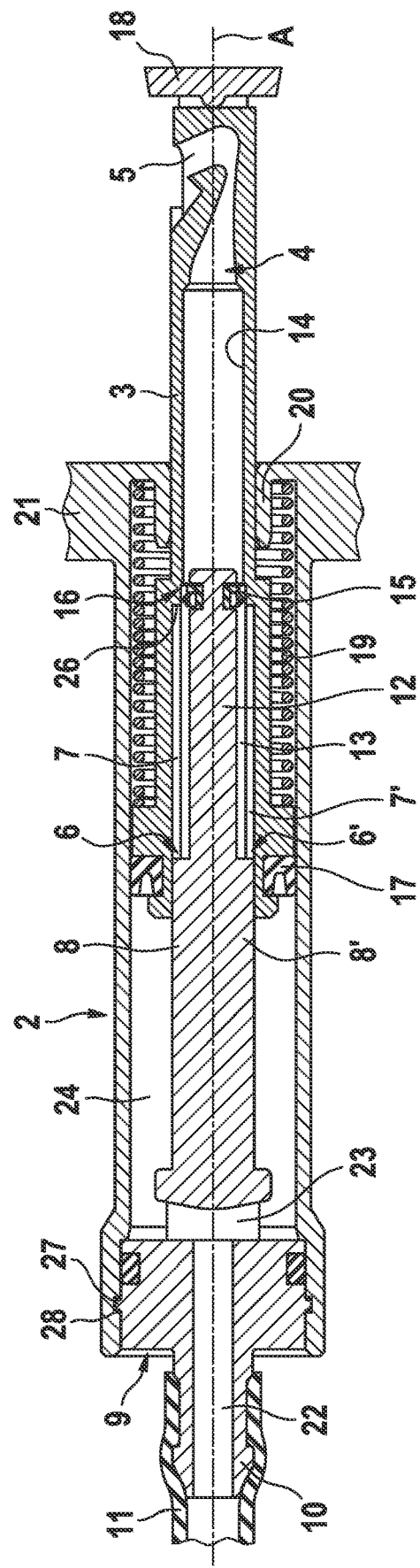

Further features, advantages and possible uses of the invention emerge from the following description. In the figures:

FIG. 1 shows a three-dimensional illustration of a first embodiment according to the invention in a non-actuated initial position (a) and in an operationally ready spraying position (b) with the deployed reciprocating piston, FIG. 2 shows a second embodiment according to the invention in longitudinal section, FIG. 3 shows a third embodiment according to the invention in longitudinal section, FIG. 4 shows an illustration of the functioning, using the example of the embodiment as per FIG. 2, FIG. 5 shows the embodiment as per FIG. 1 in longitudinal section, FIG. 6 shows an embodiment of the reciprocating piston in longitudinal section, FIG. 7 shows an embodiment of the connection piece in longitudinal section, FIGS. 8-9 show different embodiments of the reciprocating piston, with in each case a different number and position of the grooves, FIGS. 10-12 show different embodiments of the connection piece, with in each case a different number and position of the rib-like projections.

FIG. 1

The cleaning apparatus 1 according to the invention has a housing 2 with a reciprocating piston 3 arranged therein. The latter is movable from a non-actuated, retracted initial position (a) into a deployed cleaning position (b) along an actuation axis A. A conveying device (not shown here) conveys the cleaning fluid under pressure to the cleaning apparatus 1 via a feed line (likewise not shown). The cleaning fluid is introduced under pressure at the inlet side into the cleaning apparatus 1 via a connector 10 arranged concentrically with respect to the actuation axis A, displaces the reciprocating piston 3 into its deployed position (b) and, in the deployed state, is discharged onto the surface to be cleaned through a spray nozzle 5 arranged on one end of the reciprocating piston 3. As cleaning fluid, aqueous mixtures are in particular suitable, although use of air or air/liquid mixture is also possible within the invention. In the embodiment shown, two fastening tabs 21 formed on one end of the housing 2 serve for fastening the cleaning apparatus 1 in the vehicle. Furthermore, a cover element 18 is attached to the reciprocating piston 3 at one end by means of a latching connection 25. In the retracted state, the cover element 18 serves for concealing an opening in the body panel or in a vehicle attachment part, which opening is necessary for the outward movement of the reciprocating piston 3.

FIG. 2

FIG. 2 illustrates a particularly miniaturized embodiment of the cleaning apparatus 1.

The housing 2 of the cleaning apparatus 1 is of integral and substantially cup-shaped form. Its opening side is closed off in a hydraulically sealed manner by a connection piece 9. In the embodiment shown, this is realized in a materially bonded manner by welding. In other embodiments, for example as per FIG. 1, 3 or 5, this is realized by means of a force/form-fitting latching connection and an interposed, clamped seal.

In the housing 2, there is arranged a reciprocating piston 3 which is mounted so as to be movable along the actuation axis A and which extends through the housing 2 through an aperture in the base thereof. In the non-actuated, retracted initial state shown here, the reciprocating piston 3 is pressed against the connection piece by a return spring 19 supported against the housing base.

A collar 20 formed on the housing base and extended inward in an axial direction serves for precise guidance and secure support of the reciprocating piston 3, in particular for absorbing the reaction forces which arise during the spraying process in the deployed position, whereby undesired deflection of the spray jet is prevented. The collar 20 furthermore serves as an axial stop and defines the end position of the reciprocating piston 3 in the deployed state.

A piston seal 17 seals the reciprocating piston 3 radially against the cylindrical inner wall of the housing 2 and slides thereon during the stroke of the reciprocating piston 3. In this way, a pressure chamber 24 is delimited in the housing interior, which pressure chamber can be filled with cleaning fluid from a conveying device.

FIG. 3

FIG. 3 illustrates a further embodiment. Therein, the piston seal 17 is designed in the form of a corrugated bellows composed of an elastic material. The corrugated bellows is clamped in a hydraulically sealed manner at one end to the reciprocating piston 3 and at its other end between the housing 2 and the connection piece 9, whereby it also delimits the pressure chamber 24.

The elasticity of the corrugated bellows is used for moving the reciprocating piston 3 back, whereby a separate return spring 19 may be dispensed with. In this way, by contrast to embodiments according to FIGS. 1 and 2, the housing 2 may, in a manner particularly optimized in terms of production, be of conical form instead of cylindrical form. The demolding from the production tool is facilitated and requirements for the surface of the housing inner side are lower due to a lack of sliding action.

It is however possible within the invention for use to also be made of a separate return spring 19 together with the corrugated bellows if, for example, a return force able to be generated by the corrugated bellows is not sufficient on its own or a particularly quick piston return is desired.

FIG. 4

The functioning of the cleaning apparatus 1 is illustrated in simplified form in FIG. 4.

a) The reciprocal piston 3 bears axially on the connection piece 9 in the non-actuated, initial state. Upon activation of a conveying device (not shown), the pressure chamber 24 is filled with cleaning fluid, and a pressure begins to build up in said pressure chamber.

b) As soon as the pressure in the pressure chamber 24 exceeds the spring force of the return spring 19 (and the usual tribological influences), the reciprocating piston 3 is set in motion and begins to move out of the housing 2. In the process, the return spring 19 is compressed (or the corrugated bellows as per FIG. 3 are extended).

A mandrel 12 is formed radially centrally on the connection piece 9 and is provided at one end with a radially acting sealing element 15.

The reciprocating piston 3 has a stepped inner channel 4, which breaks through it completely and leads to a spray nozzle 5. In its central section, the inner channel 4 is in the form of a bore 14 which interacts with the sealing element 15 in a sealing manner. At the inlet side, the bore 14 opens out into a prechamber 13, whose diameter is greater than the outer diameter of the sealing element 15, with the result that this, in said prechamber, can be flowed around. In this way, the step-like opening-out point 16 acts with the sealing element as a travel-controlled blocking valve which, in a manner dependent on the position of the reciprocating piston 3, blocks off or opens up the inner channel 4.

Preferably, the opening-out point 16 is rounded or beveled, in order to reduce wear of the sealing element 15.

c) As soon as the sealing element 15 moves over the opening-out point 16 in the direction of the prechamber 16, the inner channel 4 is completely unblocked, and the cleaning fluid passes to the spray nozzle 5 and exits from the spray nozzle 5 as a spray jet.

The reciprocating piston 3 continues to move, by way of the pressure of the cleaning fluid, until it abuts against the collar 20. Through the design of the abutment position in combination with the cross section and length of the inner channel, it can be achieved that the spray jet exits from the spray nozzle at the same time as the abutment of the reciprocating piston 3 against the collar 20, whereby target, low-consumption cleaning of a narrowly delimited region is promoted.

d) Prevention of a follow-up flow of the cleaning fluid into the cleaning apparatus 1, for example through deactivation of the conveying device or blocking of the feed line by a suitable shut-off unit, results in the pressure being reduced and the reciprocating piston 3 being pushed back into its retracted initial position again by the force of the compressed return spring 19 and brought into axial abutment with the connection piece 9.

FIG. 5

The preferred embodiment of the cleaning apparatus 1 as per FIG. 1 is illustrated on an enlarged scale in longitudinal section in FIG. 5.

The housing 2 of the cleaning apparatus 1 is of substantially cylindrical form and is closed off at the inlet side by a connection piece 9. The connection point is realized in a hydraulically sealed manner. In the radial direction, the connection piece 9 is situated completely within a contour which is defined by the outer shell of the housing 2 in the region of the connection.

In the embodiment shown, the connection piece 9 is inserted into the housing 2 like a type of plug and is latched by means of a latching element 27. The latching element 27 is of bead-like or collar-like form and engages into a corresponding radial groove such that an axially acting form fit is formed. Within the invention, the action pairing of latching element 27/radial groove 28 may be provided as illustrated or radially reversed, with the radial groove 28 in the connection piece 9 and the latching element 27 on the housing 2. Equally, the latching element 27 may be in the form of multiple individual projections which are arranged so as to be spaced apart from one another over the circumference.

The connection piece 9 is of integral form and has, at the inlet side, a radially centrally arranged connector 10 for connection of a feed line 11 for the cleaning fluid. A feed line channel 22 formed within the connector 10 opens out into a transverse connection 23, whereby quick and uniform feeding of the pressure chamber 24 is achieved.

At the outlet side, a mandrel 12 is formed on the connection piece 9 concentrically with respect to the connector 10, which mandrel projects into the inner chamber 4 of the reciprocating piston 3 in all operating states. A sealing element 15 is arranged on the mandrel 12 in the region of the end of the mandrel.

The inner channel 4, which extends through the reciprocating piston 3, has multiple differently formed sections over its course. At the inlet side, the inner channel 4 has a relatively wide cylindrical prechamber 13 with a diameter greater than the outer diameter of the sealing element 15.

In its central section, the inner channel 4 has a bore 14 whose diameter is dimensioned for sealing action with the sealing element 15 and is thus smaller than the diameter of the prechamber 13. The bore 14 opens out into the prechamber 13 such that a step is formed at the opening-out point 16. Within the invention, the opening-out point 16 may preferably be beveled, rounded or smoothed in some other way. The mandrel 12, in cooperation with the opening-out point 16, acts with the sealing element 15 like a valve body, which, when projecting into the bore 14, blocks off the inner channel 4 in a hydraulically sealed manner.

At the outlet side, the reciprocating piston 3 has a spray nozzle 5. In the embodiment shown, the spray nozzle 5 is formed integrally with the reciprocating piston 3 as a specifically formed spray channel at the end of the inner channel 4. Within the invention, however, the spray nozzle 5 may also be provided as a conventional, separate spray insert for connection to the reciprocating piston 3.

Furthermore, a cover element 18 is connected at the outlet side to the reciprocating piston 3 via a latching connection 25. The cover element 18 may serve primarily for inconspicuous closure of an opening, required for the reciprocating piston, at the place of installation of the cleaning apparatus 1, although it may also be used for realizing certain design accents.

In the inner wall of the prechamber 13, multiple axially extended grooves 7, 7' are arranged in the reciprocating piston 3. Rib-like radial projections 8, 8' are formed on the mandrel 12, which rib-like radial projections at least regionally engage into in each case corresponding grooves 7, 7' in all operating states. In this way, a form fit acting in the circumferential direction is formed between the connection piece 9 and the reciprocating piston 3, which form fit prevents relative rotation and thus ensures at all times a defined, unchanged orientation of the reciprocating piston 3 with spray nozzle 5 in relation to the cleaning apparatus 1. At the same time, the axial guidance of the reciprocating piston 3 is also improved.

It is not absolutely necessary within the invention for the projections 8 to be formed, as shown, to be axially extended in a rib-like manner. They may equally be formed with a small axial extension, for example in a tab-like, vane-like or pin-like manner.

The radial projections 8, 8' engaging with the grooves 7, 7' thus define guide means 6, 6' for guidance and prevention of rotation of the reciprocating piston 3.

All of the grooves 7, 7' are not routed as far the opening-out point 16, but rather run out with a defined axial spacing thereto (see groove end 26). In this way, a clearly defined circular control edge is obtained for the valve function. Furthermore, the flow disturbed by guide means 6, 6' can be calmed in the cylindrical section arranged before the opening-out point 16, whereby the switching between the initial position and the spraying position of the reciprocating piston 3 is sped up overall.

FIG. 6

FIG. 6 illustrates, in longitudinal section, a preferred embodiment of the reciprocating piston 3 outside the assembly. In this embodiment, the inner wall of the prechamber 13 has four grooves 7 which are arranged so as to be uniformly spaced apart from one another in the circumferential direction.

The axial spacing between the groove end 26 and the opening-out point 16 is also made clear here.

FIG. 7

FIG. 7 shows, in longitudinal section, the connection piece 9 as per FIG. 5 outside the assembly for the purpose of illustrating the design elements and features already described above.

FIGS. 8 and 9

FIGS. 8-9 illustrate different exemplary embodiments of the reciprocating piston 3, which differ substantially in terms of number and positioning of the grooves 7, . . . .

FIGS. 10 to 12

FIGS. 10-12 illustrate different exemplary embodiments of the connection piece 9, which differ substantially in terms of number and positioning of the grooves 8, . . . .

The cleaning apparatus 1 according to the invention may be realized as a modular system by which, through targeted combinations of particular embodiments of reciprocating pistons 3 or connection pieces 9 and/or housings 2, the resulting cleaning apparatus 1 may be optimized in a flexible manner for different purposes.

In this regard, it is possible, for example by combining the reciprocating piston 3 according to FIG. 9a with the connection piece 9 according to FIG. 10a, for a single specific orientation of the spray nozzle 5 to be defined, and assembly errors to be avoided, through structural design.

By contrast, it is possible, for example by combining the reciprocating piston 3 according to FIG. 9c with the connection piece 9 according to FIG. 10a, for multiple orientations of the spray nozzle 5 to be realized with the same parts, in order for example to be usable at different places of installation.

By using variants of housings 2 with collars 20 of different lengths, the stroke length can be influenced effectively.

LIST OF REFERENCE SIGNS

1 Cleaning apparatus
2 Housing
3 Reciprocating piston
4 Inner channel
5 Spray nozzle
6 Guide means
7 Groove
8 Projection
9 Connection piece
10 Connector
11 Feed line
12 Mandrel
13 Prechamber
14 Bore
15 Sealing element
16 Opening-out point
17 Piston seal
18 Cover element
19 Return spring
20 Collar
21 Fastening tab
22 Feed line channel
23 Transverse connection
24 Pressure chamber
25 Latching connection
26 Groove end
27 Latching element
28 Radial groove
A Actuation axis

The invention claimed is:

1. A cleaning apparatus for a motor vehicle comprising:
a housing,
a reciprocating piston movable in a pressure-controlled manner in the housing and movable from a retracted initial position into a deployed cleaning position along an actuation axis, the reciprocating piston having an inner channel for transporting a cleaning fluid through the reciprocating piston to a spray nozzle, and
at least one guide configured to prevent rotation of the reciprocating piston about the actuation axis during an entire stroke of the reciprocating piston, the at least one guide arranged at least regionally in the inner channel.

2. The cleaning apparatus as claimed in claim 1, wherein the guide defines at least one groove and comprises at least one projection which is guided therein.

3. The cleaning apparatus as claimed in claim 2, wherein the projection is of rib-like form.

4. The cleaning apparatus as claimed in claim 1, further comprising:
a connection piece sealed off hydraulically with respect to the housing, the connection piece comprising a connector configured to connect to a cleaning fluid feed line and a mandrel projecting into the inner channel,
wherein the reciprocating piston interacts with the mandrel in a form fit fashion thus preventing rotation relative to the connection piece.

5. The cleaning apparatus as claimed in claim 4, wherein the inner channel is at least regionally a type of stepped bore, with a prechamber arranged at an inlet side and having a first diameter, and with a bore which opens out into the prechamber and having a second diameter smaller than the first diameter, and a sealing element configured to seal off the mandrel with respect to the bore such that the inner channel cannot be passed through hydraulically when the mandrel projects into the bore, and can be passed through hydraulically when the mandrel has been guided out of the bore.

6. The cleaning apparatus as claimed in claim 5, wherein at least one groove is arranged in an inner wall of the prechamber, and at least one projection which interacts with the groove is on the connection piece.

7. The cleaning apparatus as claimed in claim 6, wherein the groove, in a direction of the bore, ends with a defined axial spacing to an opening-out point of the bore into the prechamber.

8. The cleaning apparatus as claimed in claim 6, wherein multiple grooves, spaced apart from one another in a regular manner in a circumferential direction, are arranged in the inner wall of the prechamber.

9. The cleaning apparatus as claimed in claim 4, wherein the connection piece is connected to the housing and, in a radial direction, arranged completely within a contour which is defined by an outer contour of the housing in the region of the connection with the housing.

10. The cleaning apparatus as claimed in claim 9, wherein the connection piece is configured to be plugged into the housing.

11. The cleaning apparatus as claimed in claim 9, wherein the connection between the connection piece and the housing comprises at least one latching element producing a form fit in an axial direction.

12. The cleaning apparatus as claimed in claim 4, wherein the connection piece is integral with the connector and the mandrel, and the connector is coaxial with respect to the mandrel.

13. The cleaning apparatus as claimed in at claim 1, wherein the spray nozzle is configured to be integrated integrally in the reciprocating piston.

14. The cleaning apparatus as claimed in claim 1, wherein, on the reciprocating piston at an outlet side, there is a cover element for achieving at least one of an aesthetic and aerodynamic effect.

15. The cleaning apparatus as claimed in claim 1, wherein an axially inwardly directed collar is on the housing and serves as a stop for the reciprocating piston in deployed state, and supports the reciprocating piston in radial direction.

\* \* \* \* \*